US012660738B2

(12) United States Patent
Ryan

(10) Patent No.: US 12,660,738 B2
(45) Date of Patent: Jun. 23, 2026

(54) PRESS WHEEL

(71) Applicant: RYAN NT INTERNATIONAL PTY LTD, Horsham (AU)

(72) Inventor: Paul Ryan, Horsham (AU)

(73) Assignee: RYAN NT INTERNATIONAL PTY LTD, Horsham (AU)

( * ) Notice: Subject to any disclaimer, the term of this patent is extended or adjusted under 35 U.S.C. 154(b) by 379 days.

(21) Appl. No.: 18/213,724

(22) Filed: Jun. 23, 2023

(65) Prior Publication Data

US 2023/0413717 A1     Dec. 28, 2023

(30) Foreign Application Priority Data

Jun. 23, 2022     (AU) ................................ 2022901742

(51) Int. Cl.
*A01C 5/06* (2006.01)

(52) U.S. Cl.
CPC .................................... *A01C 5/068* (2013.01)

(58) Field of Classification Search
CPC ...................................................... A01C 5/068
See application file for complete search history.

(56) References Cited

FOREIGN PATENT DOCUMENTS

| AU | 2020200978 A1 * | 8/2020 | ............. A01C 5/068 |
| WO | WO-0176351 A1 * | 10/2001 | ........... A01B 29/046 |
| WO | WO-2018213879 A1 * | 11/2018 | ........... A01B 63/111 |

* cited by examiner

*Primary Examiner* — Matthew R Buck
(74) *Attorney, Agent, or Firm* — Bochner PLLC; Andrew D. Bochner

(57) ABSTRACT

A press wheel for use on cultivation equipment. The press wheel comprises a base plate configured to be mounted to an axle; a resilient coil member mounted to the base plate and configured to wind about the base plate to define an outer periphery of the press wheel; and at least one brace member mounted to the base plate to span at least partially across the press wheel. The at least one brace member comprises opposing ends configured to be located below the resilient coil member to prevent excessive deflection of the resilient coil member as the press wheel is in use.

11 Claims, 6 Drawing Sheets

PRESS WHEEL

CROSS-REFERENCE TO RELATED APPLICATIONS

This application claims priority to Australian Patent Application No. 2022901742, filed on Jun. 23, 2022. The contents of which are incorporated herein by reference.

FIELD OF INVENTION

The present invention relates generally to agricultural devices, and in particular, to a press wheel for use in an agricultural device.

BACKGROUND OF THE INVENTION

In agricultural equipment, such as seed drills, seeds are placed in a furrow formed in the soil to create a crop. The seed drill is typically driven by a tractor or similar device, where a disc or point forms a furrow in the soil and the seed is deposited into the furrow by a seeder unit. A press wheel typically trails the seeder unit to close the furrow and apply pressure to the soil to ensure that there is adequate contact of the seed with the soil.

The function of the press wheel is to pass over the surface of the soil to engage the sides of the furrow to close the furrow and cover the seed with soil. Conventional press wheels are made from a solid wheel with a rubber periphery that travels along the ground surface to close the furrow. A problem with such a conventional press wheel is that in some soil conditions, especially clay type soils, the rubber press wheel may compress the soil an excessive amount, resulting in the surface of the soil cracking or smearing, which can harden the soil around the seeds. This can have a significant negative effect on the growth of the seed and the crop potential.

Similarly, in no-till cropping applications, the ground surface into which the seeds are deposited typically has heavy crop residue and has not been prepared. As a result, a conventional rubber press wheel will tend to bounce along the unprepared ground surface and fail to adequately close the furrow and cover the seeds. This can have a considerable detrimental effect on the crop and the ability of the seeds to germinate and grow to an optimal level.

A variety of different types of press wheels have been developed to address this problem and to ensure adequate closing of the furrow after seeding. One such proposal has been to employ spiked closing wheels to replace traditional rubber wheels. The spiked closing wheels are able to penetrate the soil and crop residue thereby breaking up the soil in the process and avoiding bouncing of the closing wheel. However, such wheels have also been found to penetrate too deeply into the soil surface, especially in softer soil conditions, resulting in the seeds becoming displaced and requiring the operator to replace the spiked wheels during use. As a result, air pockets can be formed about the seeds and trench cracking can occur, which can result in uneven germination and inconsistent crop growth.

More recently, coil press wheels have been developed that employ a resilient coil member attached to a hub member and wound in a plurality of windings so as to substitute for a conventional tyre. This press wheel travels over the ground surface to close and compress the furrow and surrounding soil. Such coil press wheels have proven effective as they perform a squeezing action as they flex and travel over the ground surface, pressing any air pockets from the soil and providing good soil-seed contact. However, in particularly rough soil conditions, where there may be heavy stubble and uneven surface conditions, the coils may bounce and undergo deformation due to the forces present. This can cause damage to the coil wheel and can adversely affect its ability to properly function.

Thus, there is a need to provide for an improved press wheel that is capable of handling particularly rugged terrain and which protects the coil from damage during use.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a press wheel for use on cultivation equipment comprising:

a base plate configured to be mounted to an axle;

a resilient coil member mounted to the base plate and configured to wind about the base plate to define an outer periphery of the press wheel; and at least one brace member mounted to the base plate to span at least partially across the press wheel, the at least one brace member having opposing ends configured to be located below the resilient coil member to prevent excessive deflection of the resilient coil member as the press wheel is in use.

In one embodiment, the at least one brace member has pads mounted on the opposing ends thereof to provide a durable surface against which the coil contacts under deflection.

The pads may be removably mounted on the opposing ends of the at least one brace member to facilitate replacement of the pads.

In one embodiment, two brace members are mounted to the base plate and extend at least partially across the press wheel. The two brace members may extend angularly with respect to each other brace member.

The opposing ends of the at least one brace member may have a width that spans the breadth of the resilient coil member.

The base plate may comprise a central portion, a front portion and a rear portion. Each of the central portion, front portion and rear portion may be integrally formed from a sheet of metal.

The front portion may be laterally spaced in front of the central portion, and the rear portion may be laterally spaced behind the central portion. The front portion and the central portion and the rear portion and the central portion may be each connected by a planar surface extending therebetween.

The at least one brace member may be mounted to the planar surface connecting the front portion and the central portion and the rear portion and the central portion of the base plate.

BRIEF DESCRIPTION OF THE DRAWINGS

The invention may be better understood from the following non-limiting description of preferred embodiments, in which.

DETAILED DESCRIPTION OF THE DRAWINGS

Figure 1:
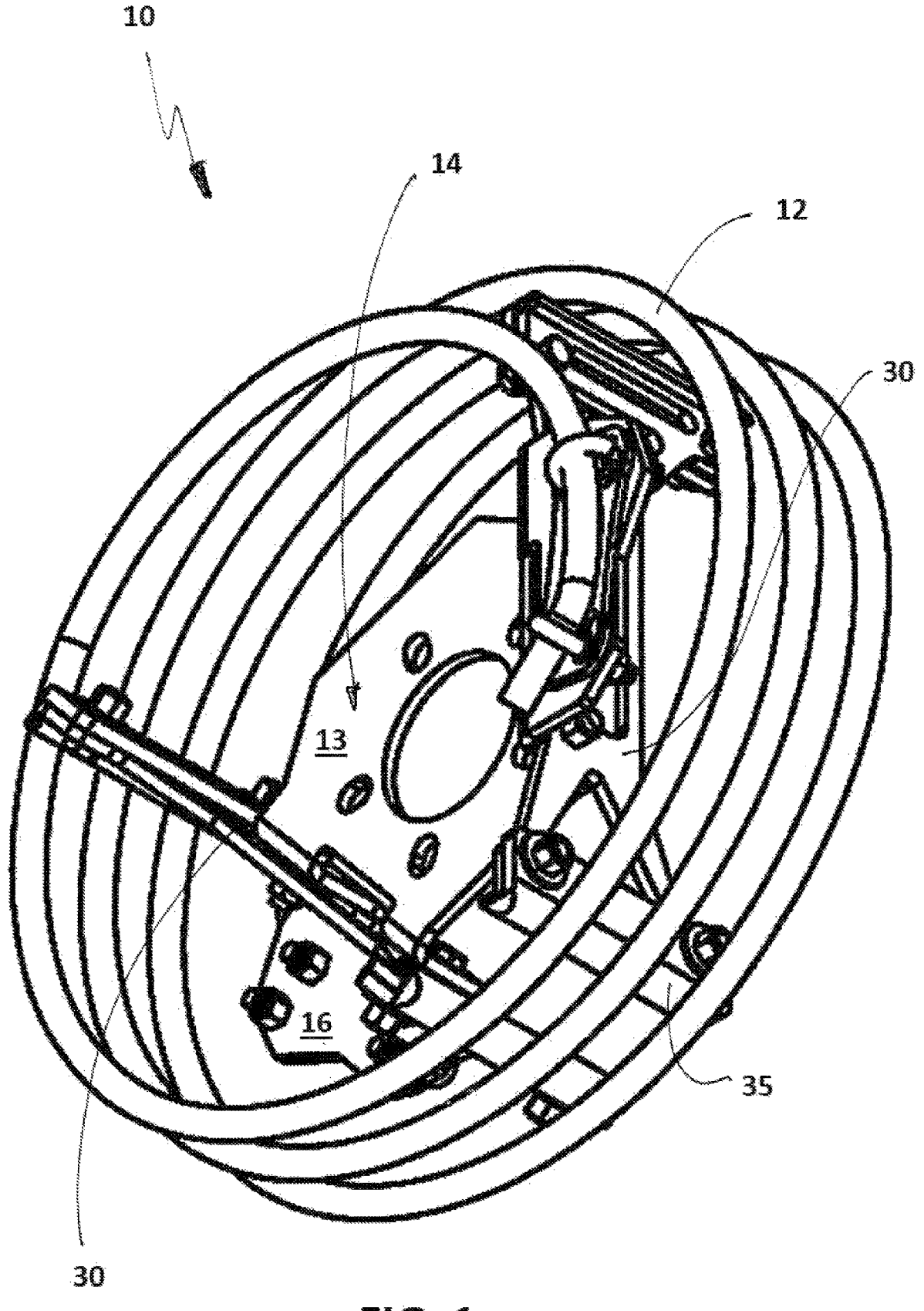
FIG. 1 is a perspective view of a press wheel in accordance with an embodiment of the present invention.

Preferred features of the present invention will now be described with particular reference to the accompanying drawings. However, it is to be understood that the features illustrated in and described with reference to the drawings are not to be construed as limiting on the scope of the invention.

The present invention will be described below in relation to a press wheel for use in a seed drill, or similar agricultural device for use in planting crops. However, it will be appreciated that the wheel of the present invention could also be used in a variety of other applications that require movement over a ground surface, and still fall within the spirit of the present invention.

Referring to FIGS. 1-4, a press wheel 10, in accordance with an embodiment of the present invention, is depicted.

The press wheel 10 generally comprises a coil 12 wound in a helical manner to form a periphery of the wheel 10. The coil 12 is made from a spring steel or similar material and has a degree of resilience to retain shape during use. The coil 12 is wound in at least three windings to provide a substantially width over which the wheel 10 is supported during motion. It will be appreciated by those skilled in the art that the number of coil windings will vary, as will the space between the windings, depending upon the requirements of use.

The coil 12 is mounted about a base plate 14. As can be more clearly seen in FIG. 4, the base plate 14 comprises a central portion 13, a front portion 15 and a rear portion 16. Each of the central portion 13, front portion 15 and rear portion 16 are integrally formed from a sheet of metal of the like, and the front portion 15 is laterally spaced in front of the central portion 13, and the rear portion 16 is laterally spaced behind the central portion 13. In this configuration, the base plate 14 defines three stepped surfaces or planes with the front portion 15 and the rear portion 16 positioned at substantially opposing ends of the base plate 14. The front portion 15 and the central portion 13 and the rear portion 16 and the central portion 13 are each connected by a planar surface extending therebetween. The planar surface may be a vertically extending face or surface.

Figure 2:
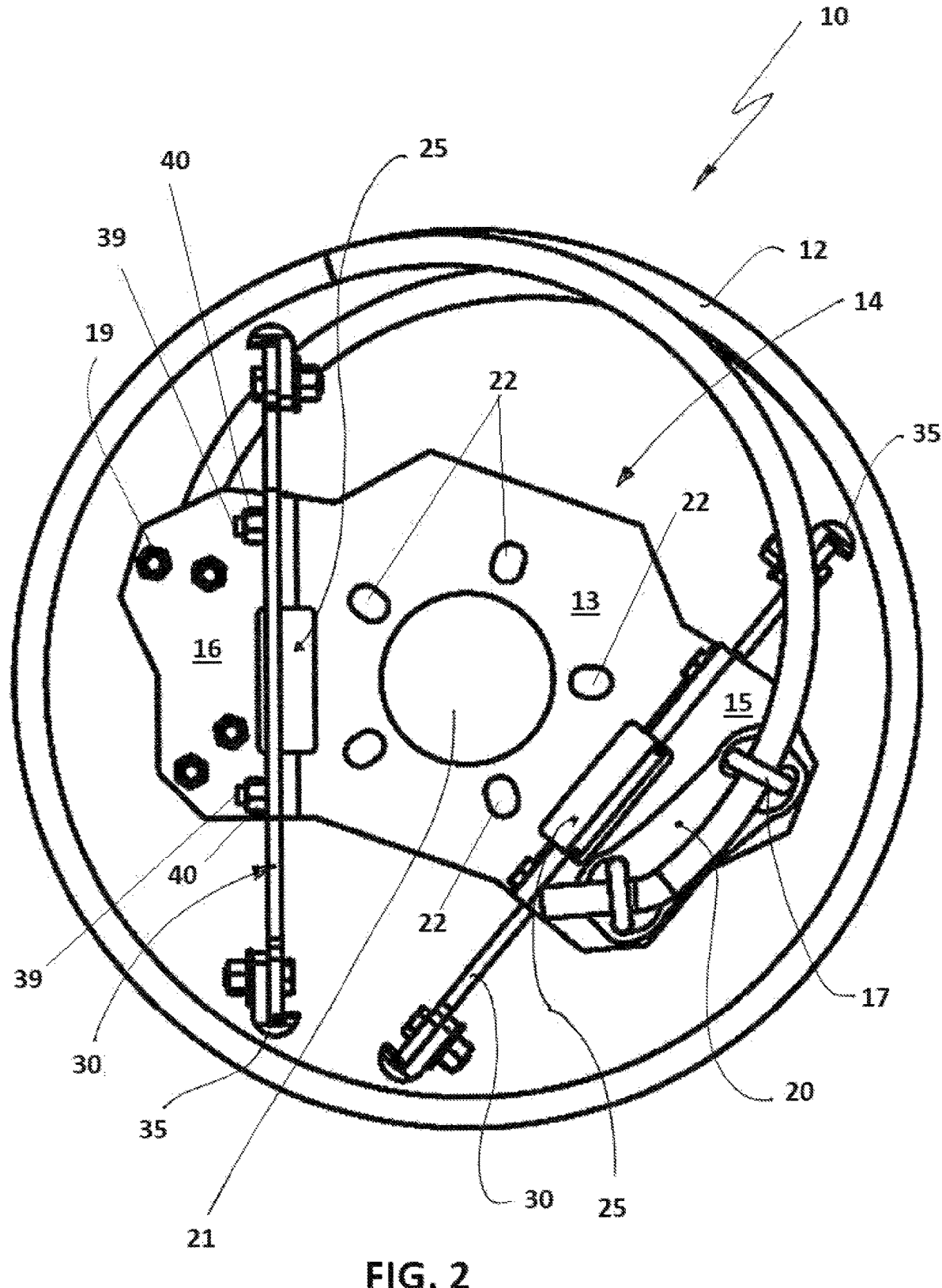
FIG. 2 is a front view of the press wheel of FIG. 1.

As is shown in FIG. 2, one end 12a of the coil 12 is mounted to the front surface of the front portion 15 of base plate 14. The other end 12b of the coil 12 is mounted to the rear surface of the rear portion 16 of the base plate 14. Each of the ends 12a and 12b are attached to the respective portions of the base plate 14 by U-bolts 17 that fit over the ends 12a, 12b of the coil 12 and pass through holes 18 formed in the respective portions of the base plate 14 to be secured in position by nuts 19. A wear plate 20 is provided to extend between the ends 12a, 12b of the coil 12 and the surface of the respective portions of base plate 14, to accommodate any friction or wearing which may result as the coil 12 flexes under use.

Figure 3:
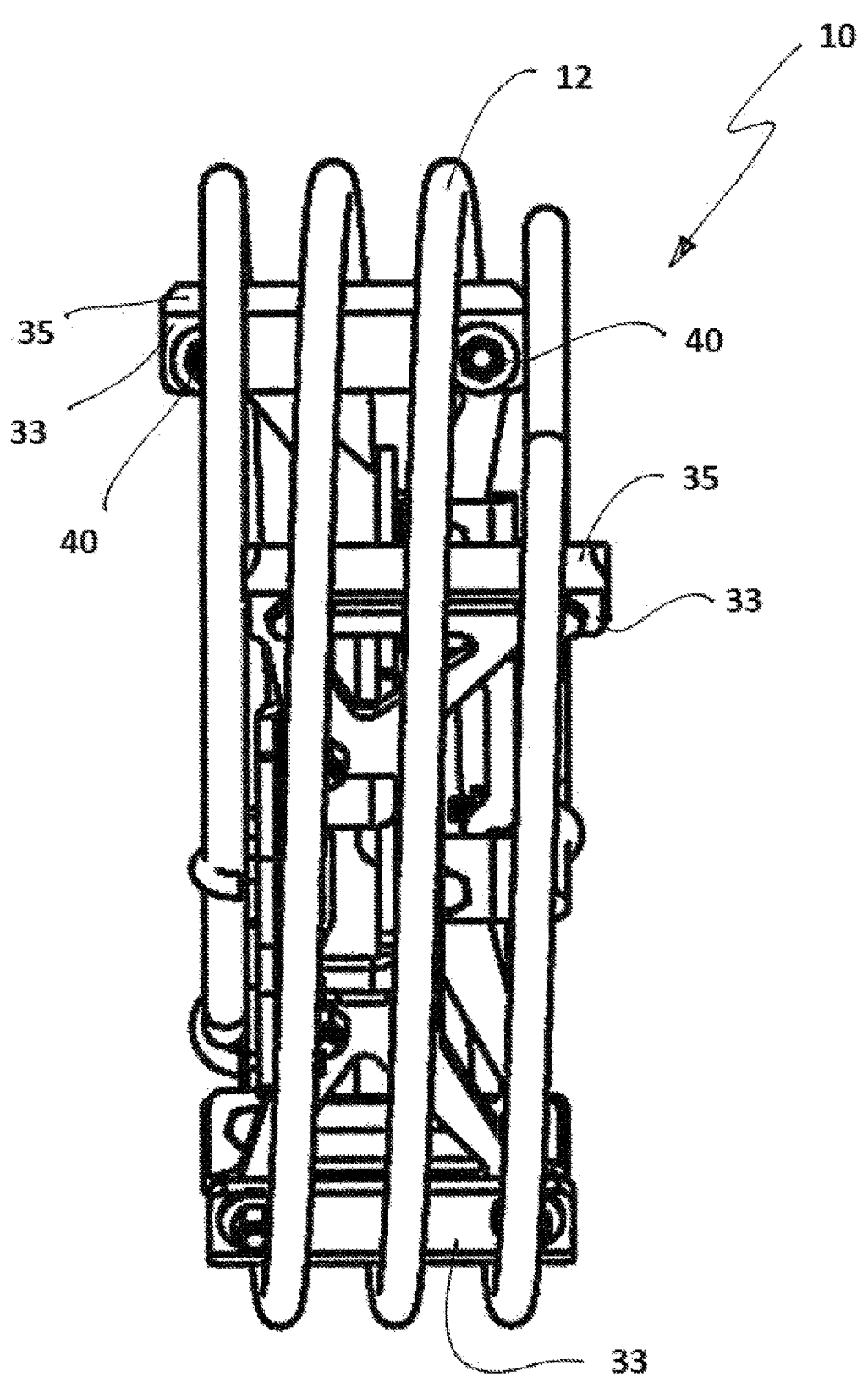
FIG. 3 is an end view of the press wheel of FIG. 1.
Figure 4:
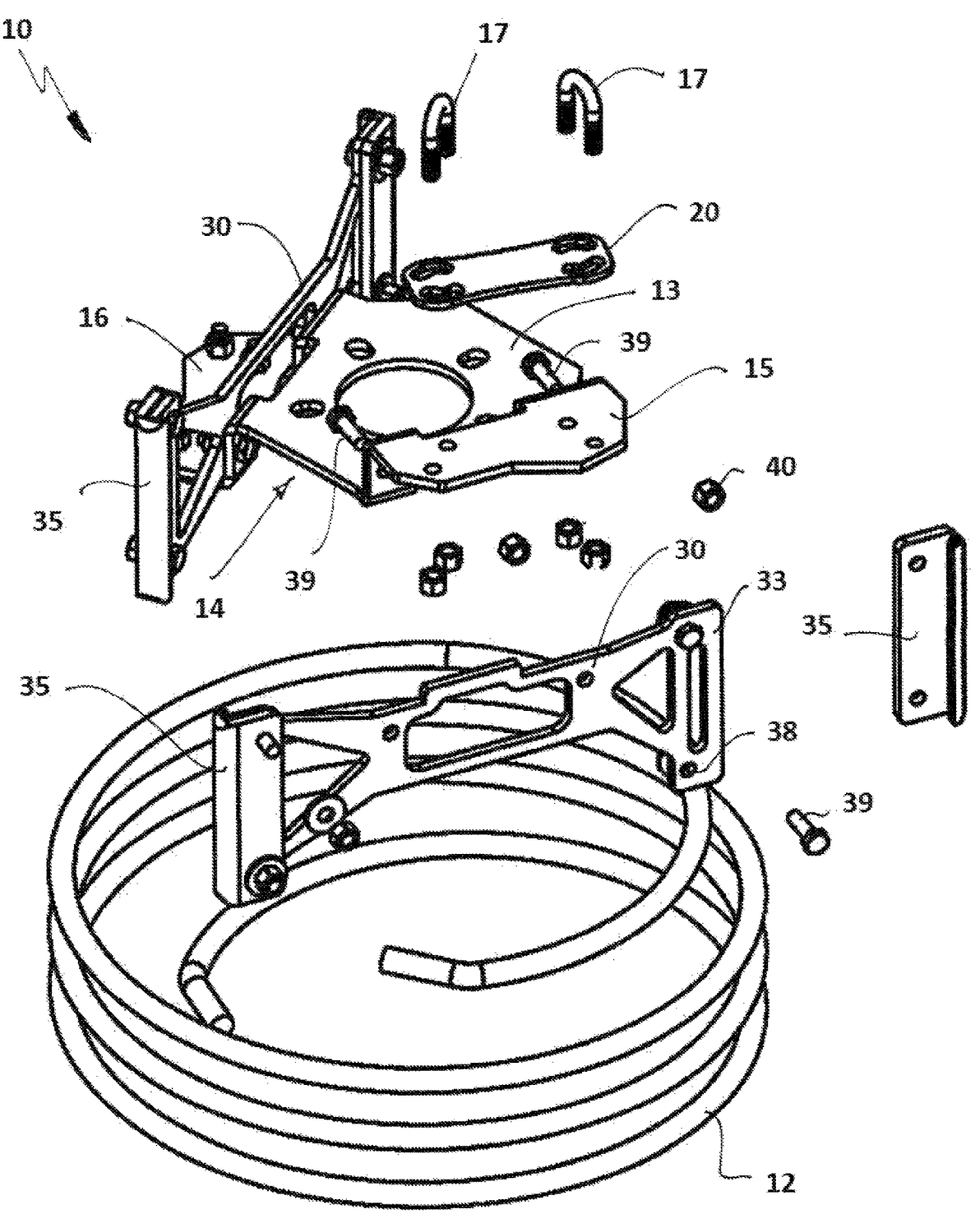
FIG. 4 is an exploded view of the press wheel of FIG. 1.

As can be seen more clearly in FIG. 3, the coil 12 forms a substantially circular outer surface around the base plate 14 and has a width that is substantially constant over the circumference of the wheel 10. In this regard, the coil 12 contacts the soil as the wheel 10 passes over the ground surface, and rotates as it contacts the ground surface to engage the sides of a furrow, to close the furrow.

To facilitate mounting of the base plate 14 to an arm of a seeder unit or the like, the central portion 13 of the base plate 14 has a central recess 21 formed therein. The central recess is substantially circular and has a plurality of holes 22 formed therearound to receive bolts or similar fastening means, to facilitate securing the base plate 14 to an axle or hub of a seeder unit or the like. This arrangement enables the wheel 10 to receive motive force to rotate under the direction of a tractor or the like.

It will be appreciated that as the wheel 10 rotates over a ground surface, the coil 12 will bear the weight of the ground contact. As the coil 12 is made from a resilient metal material, as the wheel 10 rotates it will flex to accommodate changes in the surface level of the ground. As the wheel 10 is intended to maintain contact with the ground surface to apply force to the soil and close the furrow, any bouncing of the wheel 10 during motion is to be avoided. However, with no-till farming methods becoming particularly more popular, it is common for the surface along which the wheel 10 will travel to contain stubble and other residue from previous crops, resulting in a ground surface that can be relatively uneven. In some situations, the ground surface may comprise significant surface variations which can result in the coils 12 of the wheel 10 undergoing significant forces during use. These forces can be enough to deform the coils such that the resilient properties of the coil are permanently altered and the usefulness of the wheel 10 becomes compromised.

Figure 6:
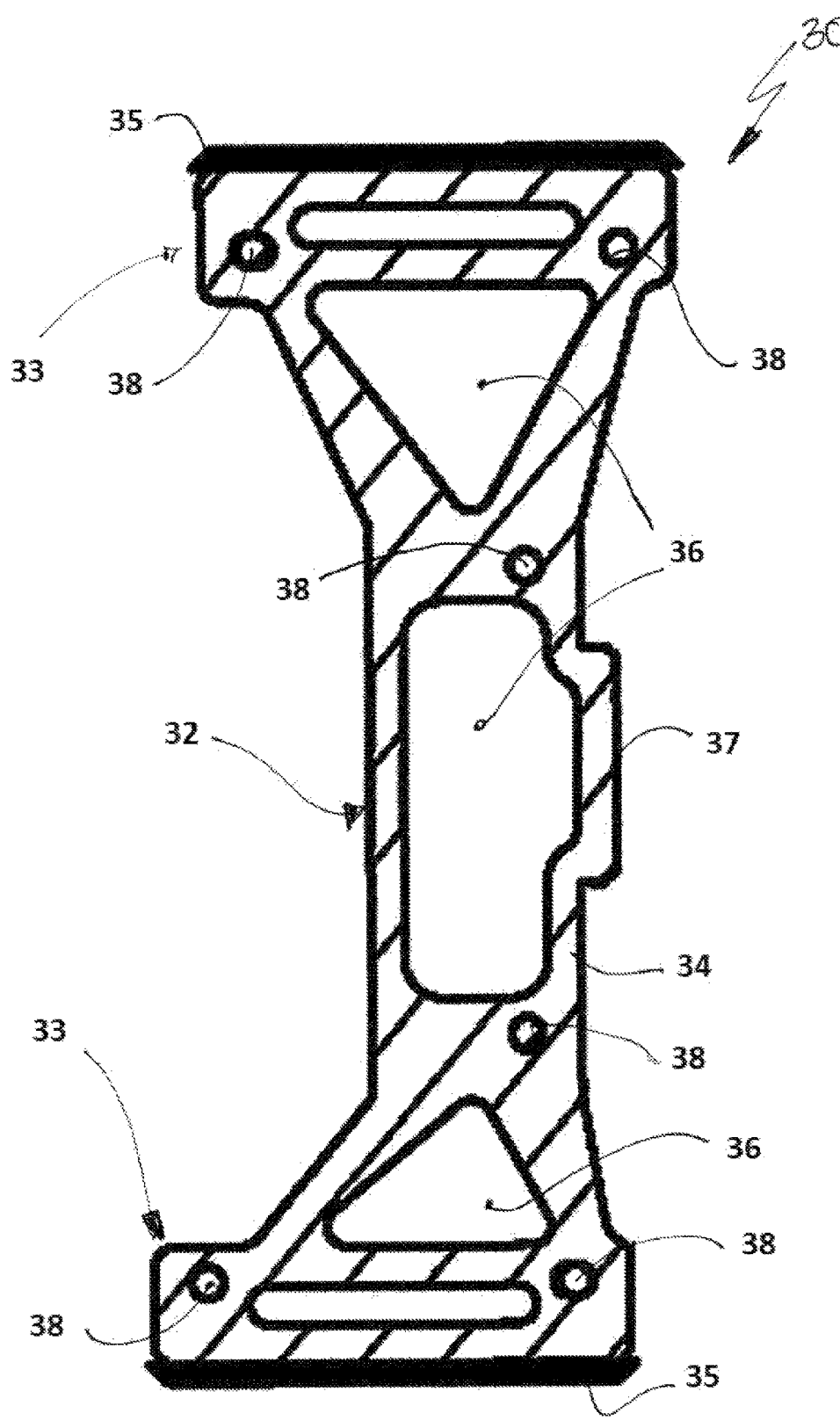
FIG. 6 is a plan view of the brace member of the press wheel of FIG. 1.

To address this problem, the present invention provides brace members 30 that attach to the base plate 14 to support the coils and prevent the coils from collapsing under pressure and deforming. The brace members 30 have a substantially planar body 32 comprising a pair of ends 33 with a bridge member 34 extending therebetween. A pad member 35 is provided on the outer surface of each of the ends 33, as shown in FIG. 6. The pad members 35 are preferably formed from a nylon or plastic material having sufficient durability to withstand impact with the coil 12 during use. The pad members 35 are preferably removably attached to the ends 33 such that they can be replaced when worn to ensure the integrity of the wheel is maintained.

The bridge member 34 has removed portions 36 formed therein, which reduce the weight of the brace member 30, without reducing its compressive strength. A locating projection 37 is formed along an edge of the bridge member 34 to locate and position the brace member in relation to the base plate 14. Holes 38 are also formed through the brace member 30 to facilitate attachment of the brace member to the base plate 14.

As is shown more clearly in FIG. 2, the brace members 30 are arranged so as to be positioned adjacent the vertical face of the base plate 14 that connects the central portion 13 to the front portion 15 and the central portion 13 to the rear portion 16. A slot 25 is provided in the front portion 15 and the rear portion 16 of the base plate adjacent the interface between the vertical face and the front portion 15 and rear portion 16. The slot 25 has a length that receives the locating projection 37 such that a bolt 39 and nut 40 can be used to pass through the holes 38 formed in the brace member 30 and corresponding holes formed in the vertical face connecting the central portion 13 and the front portion 15 and rear portion 16 of the base plate. This secures the brace member 30 in position, as shown in FIG. 2.

In this position, the brace members 30 extend substantially across the wheel 10 such that the ends 33 are positioned at opposing sides if the wheel 10. The pad members 35 located on the ends 33 of the brace members are positioned immediately below the inner surface of the coil 12, with a small gap present therebetween, as is shown in the cross-sectional view of FIG. 5.

In the configuration as depicted, two brace members 30 are arranged in a divergent manner with respect to the central recess 21 of the base plate 14. This maintains the brace members 30 free of the central recess 21 such that the wheel 10 can be mounted to an axle of an agricultural equipment. However, it will be appreciated that the number and orientation of the brace members 30 may vary.

Figure 5:
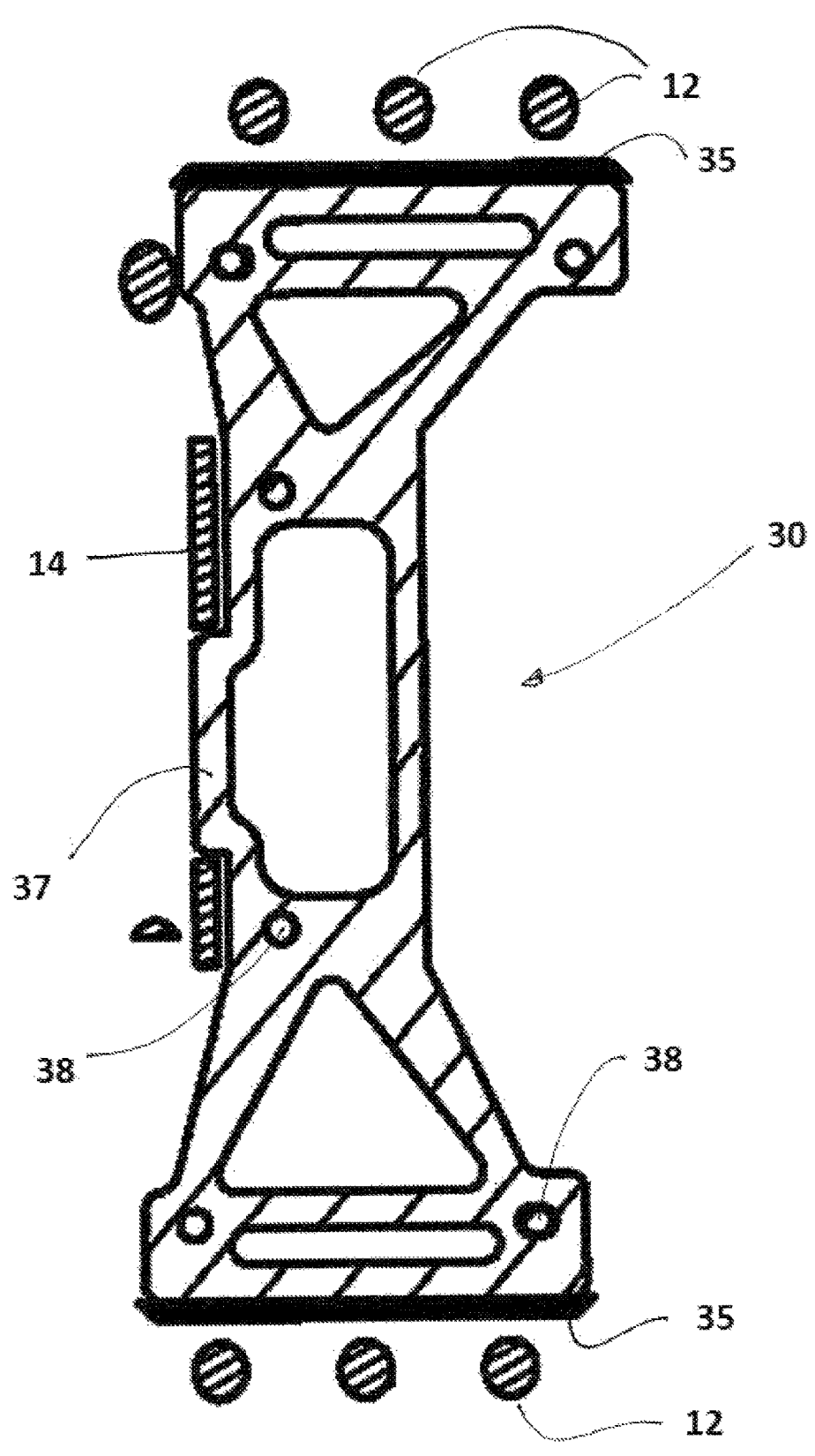
FIG. 5 is cross-sectional end view of the press wheel of FIG. 1.

As is depicted in FIG. 5, in use, the brace members 30 provide reinforcement to the coil such that if the coil 12 undergoes significant deflection as it contacts the ground surface, the coil 12 will be prevented from deforming further due to the coils 12 contacting the pad members 35 provided on the ends 33 of the brace members 30. The brace member prevents the coil 12 from undergoing plastic deformation and maintains resilient movement of the coils 12 as they travel over the ground surface. Such a system ensures that the press wheel 10 is able to perform its desired function and maintain maximum contact with the soil as it passes over the ground surface. This maximises the life of the press wheel 10 and minimises the need for ongoing maintenance and replacement of the press wheels.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the wheel uppermost.

It will be appreciated by those skilled in the art that many modifications and variations may be made to the methods of the invention described herein without departing from the spirit and scope of the invention.

The invention claimed is:

1. A press wheel for use on cultivation equipment comprising:

a base plate configured to be mounted to an axle;

a resilient coil member mounted to the base plate and configured to wind about the base plate to define an outer periphery of the press wheel; and at least one brace member removably mounted to the base plate to span at least partially across the press wheel, the at least one brace member having a planar body having a pair of opposing ends, with the opposing ends each being configured to be located below the resilient coil member to prevent excessive deflection of the resilient coil member as the press wheel is in use.

2. A press wheel according to claim 1, wherein the at least one brace member has pads mounted on the opposing ends thereof to provide a durable surface against which the coil member contacts under deflection.

3. A press wheel according to claim 2, wherein the pads are removably mounted on the opposing ends of the at least one brace member to facilitate replacement of the pads.

4. A press wheel according to claim 3, wherein two brace members are mounted to the base plate and extend at least partially across the press wheel.

5. A press wheel according to claim 4, wherein the two brace members extend angularly with respect to each other brace member.

6. A press wheel according to any one of the preceding claims, wherein the opposing ends of the at least one brace member have a width that spans the breadth of the resilient coil member.

7. A press wheel according to claim 1, wherein the base plate comprises a central portion, a front portion and a rear portion.

8. A press wheel according to claim 7, wherein each of the central portion, front portion and rear portion are integrally formed from a sheet of metal.

9. A press wheel according to claim 7, wherein the front portion is laterally spaced in front of the central portion, and the rear portion is laterally spaced behind the central portion.

10. A press wheel according to claim 9, wherein the front portion and the central portion and the rear portion and the central portion are each connected by a planar surface extending therebetween.

11. A press wheel according to claim 10, wherein the at least one brace member is mounted to the planar surface connecting the front portion and the central portion and the rear portion and the central portion of the base plate.

* * * * *